Patented June 13, 1939

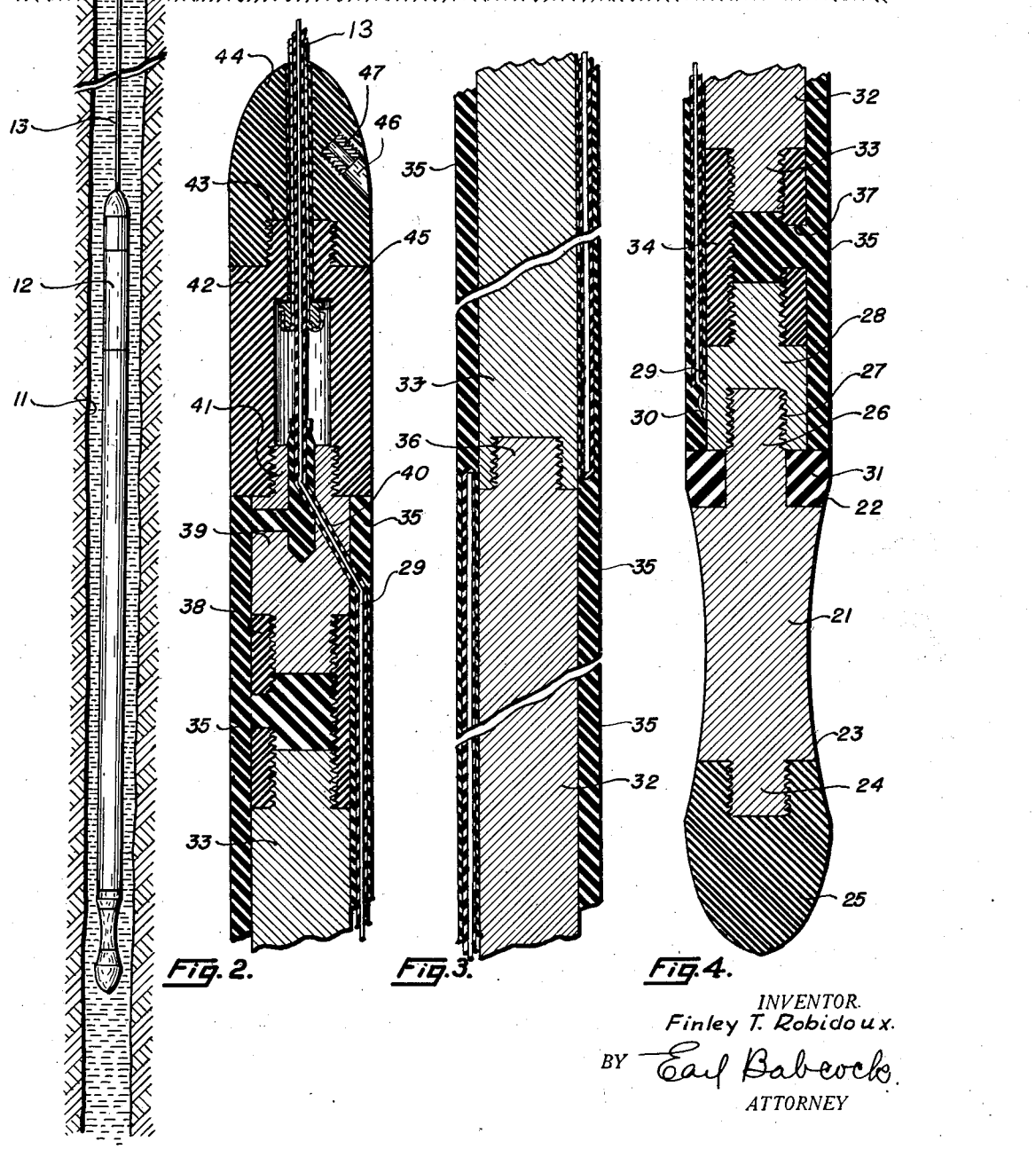

2,161,976

UNITED STATES PATENT OFFICE 2,161,976

ELECTRODE FOR WELL LOGGING

Finley T. Robidoux, Houston, Tex., assignor to Halliburton Oil Well Cementing Company, Duncan, Okla.

Application February 3, 1938, Serial No. 188,428

3 Claims. (Cl. 175—182)

This invention relates to apparatus for logging wells, such as oil wells, and more particularly to an electrode adapted for use for determining the nature of the formation or strata through which a well is bored.

Methods and apparatus for logging wells are well known. An example of apparatus for this purpose is disclosed in the patent to Blau and Gemmer, No. 2,037,306 granted April 14, 1936, for "Method and apparatus for logging a well".

The present invention relates to the construction of an electrode adapted for use in a system like that described in the Blau et al. patent mentioned above or in other well logging operations in which the impedance or resistance or potential or some other electrical characteristic of the formations or strata adjoining a well are being determined or compared.

In attempting to carry out electrical logging operations where an electrode is lowered through mud or other fluid in a well by means of an insulated conductor cable, difficulty has been experienced due to the fact that the electrode moves into contact or drags along the wall of the well in some portions thereof, while moving free of the wall in other portions. Unless care is exercised this sets up variations in the electrical characteristics of the circuit of which the electrode forms a part and renders the readings or records obtained inaccurate. This is specially disadvantageous where the electrode is moved at a comparatively high speed, say 300 feet per minute, such as required in modern well logging operations.

To overcome this difficulty, it is one object of the present invention to provide an electrode with suitable insulators both above and below that portion which is sensitive to the electrical characteristic of the formation to be determined so as to prevent the electrode from contacting the wall of the well.

It is a further object of the invention to provide an electrode of sufficient weight that it can travel rapidly through drilling mud or other rather heavy and viscous fluid and to so arrange the weighted portions thereof as to minimize interference with the electrical properties being determined.

It is still another object of the invention to provide an electrode adapted for use in electrical well logging operations which is rugged in construction, which has practically constant dielectric properties in the insulating portions thereof, which is easy to fabricate and assemble and in which the weight may be varied in the field without special tools so as to meet the particular requirements of well logging operations.

Other objects and advantages reside in certain novel features of the arrangement and construction of parts, as will be more apparent from the following description taken in connection with the accompanying drawing, in which:

Figure 1 is a vertical cross-sectional view of a section of a well showing the electrode in position therein and illustrating diagrammatically a reel and electrical apparatus at the surface of the well for logging variations in some electrical property of the formation around the well as the electrode is moved therein;

Figure 2 is a vertical cross-sectional view of the upper portion of the electrode shown in Figure 1;

Figure 3 is a view in vertical cross-section of fragments of the central portion of the electrode shown in Figure 1; and Figure 4 is a vertical cross-sectional view of the lower portion of the electrode shown in Figure 1; Figures 2, 3 and 4 showing contiguous parts of the electrode as assembled.

Referring to the drawing in detail, and first to Figure 1, it will be seen that an oil well is there illustrated at 11, the well having an electrode designated generally at 12 therein, being supported by means of an insulated electrical conductor cable 13 which passes over a pulley 14 at the well head and thence to a reel or drum represented diagrammatically at 15. The pulley 14 may be provided with a counter for determining the number of feet or cable unreeled from the drum 15.

In the apparatus herein illustrated it is contemplated that only a single insulated conductor is used between the electrode 12 and electrical logging apparatus at the surface of the well. To establish electrical contact with the conductor of the cable an insulated slip ring 16 may be provided on the drum 15 and connected thereto. A contact member 17 may brush the slip ring 16 and constitute means for conveying current from the electrode to electrical apparatus within the box represented diagrammatically at 18. To complete the electrical circuit the apparatus within the box 18 may be grounded by any suitable means such as the conductor 19 connected to a metallic plate 20 which may be thrown into the slush pit near the well or otherwise establish contact with the earth.

The apparatus within the box 18 is well known to those skilled in the art and need not be described herein, inasmuch as it forms no part of the present invention. By way of example, it may be said, however, that the apparatus may be similar to that shown in the Blau et al. patent referred to above, or it may consist merely of a sensitive voltmeter or potentiometer in the event that potentials existing within the earth or within the well are being measured, or to a combination of means for measuring impedance and potential, etc.

The electrode itself which forms the subject matter of the present invention involves an electrode proper, suitable insulating means and members which add weight thereto, together with means for making electrical connection between the conductor of a cable and the electrode proper.

In the arrangement shown in the drawing the electrode proper is at the lower portion of the electrode assembly and, as shown in Figure 4, may consist of a metallic member 21, circular in cross-section, and of slightly larger diameter at its ends than at its central portion. Good results have been obtained where this member and all other metal parts of the entire electrode assembly are made of "Tobin" bronze, but it is obvious that other metals might be used. It should be noted that a fairly heavy metal enables the electrode assembly to have sufficient weight without being too bulky.

The member 21 is cut away at its upper and lower ends to provide shoulders 22 and 23. Beneath the shoulder 23 the member is provided with a stud or extension 24 which is threaded so that it may be screwed into a tip member 25 made of "Catalin" or other hard abrasion-resisting insulating material.

Above the upper shoulder 22 of the member 21 an upwardly extending stud 26 is provided and partially threaded as shown at 27. This forms means for connecting the electrode 21 to a contact coupling member 28 which may also be made of bronze and to which the conductor 29 of the insulated conductor cable 13 may be soldered as shown at 30. A ring or gasket 31 of hard rubber may be clamped between the contact coupling 28 and the electrode 21.

Within the electrode assembly above the electrode proper and the contact coupling 28 a number of cylinders of heavy material, such as bronze, are provided to give additional weight thereto. Two such members are shown in the drawing and are designated 32 and 33. It is important that these members for adding weight be thoroughly and permanently insulated from the electrode 21 and any slight variations in the di-electric strength of insulating means between these members and the electrode is apt to interfere with the proper use of the apparatus. To accomplish this the lower weight member 32 is provided with a stud 33 on its lower end which is suitably threaded so that it may be connected to an insulating cylinder 34 of "Bakelite". As is well known, "Bakelite" is a good insulator and has other desirable characteristics, such as high strength, but it has been determined that the di-electric strength of this material deteriorates rather rapidly when the material is lowered into a deep well. This may be due to the fact that the temperatures and pressures to which the "Bakelite" is exposed approach those under which it is manufactured and this results in moisture from the fluids in the well penetrating and impregnating the paper or cloth used in the manufacture. Accordingly, the "Bakelite" cylinder 34 and all the other "Bakelite" parts of the electrode assembly are shielded and protected from the fluids in the well by a rubber sheath which extends from the hard rubber bushing 31 upwardly along the electrode to a point well above the upper end of the weight 33. Such a sheath is shown at 35.

The two weight members 32 and 33 may be connected together by means of a screw threaded joint construction shown at 36. By making the weight members in two parts it is more convenient to assemble the construction than would be the case if only one weight member were employed, inasmuch as the rubber sheath 35 can be vulcanized to the members 32 and 33 over a major portion of their length before the two are assembled together.

The insulated conductor 29 extends downwardly through the rubber sheath 35 to make contact with the coupling 28 and the electrode 21 as previously described. In making the construction two insulated wires are imbedded in the sheath along the weight members 32 and 33 respectively and these are joined together after the weight members are screwed together at the joint 36, the electrical connection being soldered together then covered with rubber tape and the assembly then vulcanized so that when the electrode assembly is completed no joint is visible from the outside of the sheath 35 opposite the joint 36 between the members 32 and 33. However, for purposes of illustration, a joint has been shown in the sheath in Figure 3 opposite the joint 36.

It should be mentioned that in vulcanizing the rubber sheath 35 around the contact coupling member 28, the "Bakelite" cylinder 34 and the weight members 32 and 33, a bond is effected between the rubber sheath and the metal parts. This is commonly referred to in the trade as vulcanizing the rubber to the metal. The rubber does not adhere materially to "Bakelite" but due to the effective bond both above and below the "Bakelite" portions of the assembly, no water can penetrate through the sheath and come in contact with the "Bakelite". The "Bakelite" cylinder 34 is provided with an opening along one side, as shown at 37, so that the interior of the cylinder 34 may be filled with rubber.

At the upper end of the upper weight member 33 in the assembly a "Bakelite" cylinder 38 is provided and connected to the weight member 33 by means of screw threads. This cylinder may be the same or similar to the "Bakelite" cylinder 34 and is protected by the rubber sheath 35 in the same way. The cylinder 38 provides means for connecting a bronze coupling member 39 to the weight 33. The member 39 is provided merely to give strength to the assembly and to provide means for sealing off the insulated conductor 29 against the flow of water or other fluid along it through the insulating sheath 35. The member 39 is bored to provide a conduit 40 for the passage of the insulated conductor 29, from the sheath 35 inwardly to the center or axis of the electrode assembly. The member 39 is also provided with a recess 41 in its upper portion which is adapted to be filled with rubber and vulcanized to effectively seal the insulated conductor 29.

Screw threaded to the upper end of the member 39 is a socket arrangement consisting of a housing 42 screw threaded interiorly at its lower end to provide means for making connection to the member 39 and provided with a stud 43 at its upper end for making connection to a cap and lifting member 44 at its upper end. The socket member 42 may be made of "Bakelite" and is provided with a space for the cable terminal and strain-relief clamp, such as illustrated at 45.

The sheath of the cable 13 extends downwardly and is gripped within the clamping member and transmits stress from the electrode to the steel wires of the sheath of the cable while the insulated conductor 29 is thus relieved of strain as it passes downwardly through the electrode assembly.

The cap 44 is also preferably made of "Bakelite". It is provided with a recess 46 which may be provided with a bronze bushing 47 as illustrated, to provide means for engaging a hook when it is desired to lift the electrode out of the well at the end of a logging operation.

In the field the weight members 32 and 33 cannot be taken apart, inasmuch as the sheath 35 has been vulcanized therearound. However, should it be desired at any time to increase the weight of the electrode assembly this can easily be done by unscrewing the cap 44, moving it upwardly along the cable 13 and inserting an additional weight member between the cap and the member 42. Such an additional weight member would of course be provided with female threads at its lower end and male threads at its upper end to accommodate the threaded connections on the members 42 and 44. It would also of course have to be slotted longitudinally so that it can be placed around the cable.

In the arrangement shown no attempt has been made to keep mud out of the cap 44 and member 42 above the seal provided in the member 39 around the insulated conductor.

With this construction it will be seen that an electrode assembly has been provided in which the electrode proper 21 can be brought into good electrical contact with the mud or other fluid in the well and in which this electrode will be adequately protected and held out of contact with the actual walls of the well. At the same time, the weights used to enable the electrode to move at a high speed through the mud are adequately insulated from the electrode proper and that the entire assembly is of sufficient strength to permit a rough usage and use under difficult conditions.

While only one embodiment of the invention has been shown and described herein, it is obvious that various changes may be made without departing from the spirit of the invention or the scope of the annexed claims.

I claim:

1. An electrode assembly adapted for use in electrical well logging operations, said assembly including an electrode adapted to make electrical contact with mud or other fluid in a well and means for holding the electrode out of direct contact with the wall of a well as it is moved therein, thereby avoiding interference in some electrical property being logged due to intermittent contact between the electrode and the wall of the well, said means including a tip made of insulating material secured to the lower end of said electrode and member made of insulating material adjacent the upper end of said electrode, said tip and member being of a greater diameter than said electrode.

2. In an electrode assembly adapted for use in electrical well logging operations, the combination with an elongated electrode having a reduced central portion and enlarged end portions of means for preventing said electrode from making direct contact with the walls of the wells, said means including insulating spacing members associated with said enlarged end portions, said members being of larger diameter than said end portions.

3. An electrode assembly adapted for use in electrical well logging operations, said assembly including an electrode, a heavy metallic weight member, means for insulating and mechanically connecting the weight member from and to the electrode, means for holding the electrode out of contact with the walls of a well as it is moved therein and means for connecting an electrical conductor to said electrode, the elements recited being combined into a unitary rigid construction adapted to be suspended on said conductor.

FINLEY T. ROBIDOUX.